(12) United States Patent
Snapp et al.

(10) Patent No.: US 7,587,408 B2
(45) Date of Patent: Sep. 8, 2009

(54) METHOD AND SYSTEM FOR STORING AND RETRIEVING DATA USING HASH-ACCESSED MULTIPLE DATA STORES

(75) Inventors: Robert F. Snapp, Memphis, TN (US); David J. Payne, Collierville, TN (US); James D. Wilson, Collierville, TN (US)

(73) Assignee: United States Postal Service, Washington, DC (US)

( * ) Notice: Subject to any disclaimer, the term of this patent is extended or adjusted under 35 U.S.C. 154(b) by 1002 days.

(21) Appl. No.: 10/377,989

(22) Filed: Feb. 28, 2003

(65) Prior Publication Data

US 2003/0182568 A1 Sep. 25, 2003

Related U.S. Application Data

(60) Provisional application No. 60/366,805, filed on Mar. 21, 2002.

(51) Int. Cl.
*G06F 17/00* (2006.01)
(52) U.S. Cl. .......................... 707/102; 707/101; 707/1; 707/3
(58) Field of Classification Search .................. 707/1, 707/3, 4, 100, 101, 102
See application file for complete search history.

(56) References Cited

U.S. PATENT DOCUMENTS

| | | | |
|---|---|---|---|
| 4,871,903 A | 10/1989 | Carrell | |
| 5,204,966 A | 4/1993 | Wittenberg et al. | |
| 5,420,403 A | 5/1995 | Allum et al. | |
| 5,491,752 A | 2/1996 | Kaufman et al. | |
| 5,742,807 A * | 4/1998 | Masinter | 707/1 |
| 5,819,291 A | 10/1998 | Haimowitz et al. | |
| 5,893,120 A | 4/1999 | Nemes | |
| 5,903,651 A | 5/1999 | Kocher | |

(Continued)

FOREIGN PATENT DOCUMENTS

CN 1311486 9/2001

(Continued)

OTHER PUBLICATIONS

"IBM DB2 Anonymous Resolution Version 3.8 Technical Information," Publication of IBM Corporation, USA, May 2005 (2 pages).

(Continued)

*Primary Examiner*—Sana Al-Hashemi
(74) *Attorney, Agent, or Firm*—Finnegan, Henderson, Farabow, Garrett & Dunner, LLP

(57) ABSTRACT

A method and system for storing and retrieving data using hash-accessed multiple data stores, provides data protection while requiring low computational overhead and further provides storage and retrieval access based on only a single piece of access information, which is generally public. The algorithms provide high security against data-mining and other examination of the data stores. The access information is hashed and is split into offset fields used as indices into a plurality of data stores, generating a quasi-random relationship between the access information and the location of portions of a stored data element. Further protection may be provided by striping the data across the data stores in conformity with a striping order selected by a field of the hashed access information.

18 Claims, 4 Drawing Sheets

U.S. PATENT DOCUMENTS

| | | | |
|---|---|---|---|
| 5,933,604 | A | 8/1999 | Inakoshi |
| 5,966,542 | A | 10/1999 | Tock |
| 6,006,200 | A | 12/1999 | Boies et al. |
| 6,289,334 | B1* | 9/2001 | Reiner et al. .................... 707/3 |
| 6,289,450 | B1 | 9/2001 | Pensak et al. |
| 6,308,247 | B1 | 10/2001 | Ackerman et al. |
| 6,347,376 | B1 | 2/2002 | Attwood et al. |
| 6,457,012 | B1* | 9/2002 | Jatkowski ................... 707/101 |
| 6,516,320 | B1* | 2/2003 | Odom et al. ................ 707/101 |
| 6,754,785 | B2 | 6/2004 | Chow et al. |
| 6,763,344 | B1 | 7/2004 | Osentoski et al. |
| 7,124,408 | B1 | 10/2006 | Parthasarathy et al. |
| 7,159,119 | B2 | 1/2007 | Wilson et al. |
| 7,302,582 | B2 | 11/2007 | Snapp et al. |
| 2001/0044783 | A1 | 11/2001 | Weisberg et al. |
| 2001/1004478 | | 11/2001 | Weisberg et al. |
| 2002/0049670 | A1 | 4/2002 | Moritsu et al. |
| 2002/1004967 | | 4/2002 | Moritsu et al. |
| 2003/0028783 | A1 | 2/2003 | Collins et al. |
| 2003/0177021 | A1 | 9/2003 | Dutta |
| 2004/0065598 | A1 | 4/2004 | Ross et al. |
| 2004/1006559 | | 4/2004 | Ross et al. |
| 2004/0111443 | A1* | 6/2004 | Wong et al. ................. 707/202 |
| 2004/0128247 | A1 | 7/2004 | Sato et al. |
| 2004/0128274 | A1* | 7/2004 | Snapp et al. ................... 707/1 |
| 2004/0181670 | A1 | 9/2004 | Thune et al. |
| 2004/0210763 | A1 | 10/2004 | Jonas |
| 2005/0060556 | A1 | 3/2005 | Jonas |
| 2005/0066182 | A1 | 3/2005 | Jonas et al. |

FOREIGN PATENT DOCUMENTS

| | | |
|---|---|---|
| DE | 44 21 640 | 8/1995 |
| EP | 0 381 418 | 8/1990 |
| WO | WO 2004/023711 A1 | 3/2004 |

OTHER PUBLICATIONS

Friedrich, Andrew, "IBM DB2 Anonymous Resolution: Knowledge Discovery Without Knowledge Disclosure," Whitepaper of IBM Corporation, USA, May 2005 (23 pages).

"DB2 Anonymous Resolution for Public Safety, Corrections, & Criminal Intelligence," Publication of IBM Corporation, USA, Feb. 2005 (2 pages).

"DB2 Anonymous Resolution," Publication of IBM Corporation, USA, May 2005 (2 pages).

Lohr, Steve, "I.B.M. Software Aims to Provide Security Without Sacrificing Privacy," The New York Times, May 24, 2005 (2 pages).

"Application of DB2 Anonymous Resolution to the Financial Services Industry," Whitepaper of IBM Corporation, USA, May 2005 (17 pages).

Carter et al., "Exact and Approximate Membership Testers," ACM 10th STOC, pp. 59-65, (1978).

Bellare et al., "Collision-Resistant Hashing: Towards Making UOWHFs Practical," Advances in Cryptology Conference (CRYPTO); Germany; Vol. Conf. 17, pp. 470-484, (1997).

International Search Report for PCT/US01/26125, 3 pages mailed Mar. 26, 2002.

Office Action issued Aug. 7, 2008 in related U.S. Application No. 11/231,989, filed Sep. 22, 2005, 20 pages.

Carter et al., ''Exact and Approximate Membership Testers,' Acm 10th Stoc, pp. 59-65, (1978).

Bellare et al., 'Collision-Resistant Hashing: Towards Making U0WHFs Practical,' Advances in Cryptology Conference (Crypto); Germany; Vol. Conf. 17, pp. 470-484, (1997).

Copy of International Search Report for PCT/US01/26125, 3 pp. mailed 26 Mar. 2002.

"IBM DB2 Anonymous Resolution Version 3.8 Technical Information," Publication of IBM Corporation, Usa, May 2005 (2 pages).

Friedrich, Andrew, "IBM DB2 Anonymous Resolution: Knowledge Discovery Without Knowledge Disclosure," VVhitepaper of IBM Corporation, Usa, May 2005 (23 pages).

'DB2 Anonymous Resolution for Public Safety, Corrections, & Criminal Intelligence, Publication of IBM Corporation, Usa, Feb. 2005 (2 pages.).

"DB2 Anonymous Resolution," Publication of IBM Corporation, Usa, May 2005 (2 pages).

Lohr, Steve, "I.B.M. Software Aims to Provide Security Without Sacrificing Privacy," the New York Times, May 24, 2005 (2 pages).

"Application of DB2 Anonymous Resolution to the Financial Services Industry,"Whitepaper of IBM Corporation, Usa, May 2005 (17 pages).

Office Action, dated Nov. 28, 2006, for U.S. Appl. No. 10/344,990, filed Feb. 20, 2003 (4 pages).

Office Action, dated Apr. 4, 2006, for U.S. Appl. No. 10/344,990, filed Feb. 20, 2003 (8 pages).

Office Action, dated Oct. 27, 2005, for U.S. Appl. No. 10/459,013, filed Jun. 11, 2003 (12 pages).

Office Action, dated Mar. 24, 2005, for U.S. Appl. No. 10/459,013, filed Jun. 11, 2003 (14 pages).

Office Action, dated Sep. 3, 2004, for U.S. Appl. No. 10/459,013, filed Jun. 11, 2003 (12 pages).

Office Action, dated Jun. 3, 2008, for U.S. Appl. No. 11/235,243, filed Sep. 27, 2005 (8 pages).

Office Action, dated Jul. 16, 2008, for U.S. Appl. No. 11/638,445, filed Dec. 14, 2006 (8 pages).

Office Action, dated Aug. 7 ,2008, for U.S. Appl. No. 11/231,989, filed Sep. 22, 2005 (15 pages).

Pre-Interview Communication, dated Sep. 12, 2008, for U.S. Appl. No. 11/231,989, filed Sep. 22, 2005 (3 pages).

Pre-Interview First Office Action, dated Dec. 2, 2008, for U.S. Appl. No. 11/231,989, filed Sep. 22, 2005 (3 pages).

Notice of Allowance and Allowability, dated Jul. 17, 2007, for U.S. Appl. No. 10/344,990 (6 pages), with Responses to Office Action, filed May 29, 2007, including listing of allowed claims (22 pages).

Notice of Allowance and Allowability, dated May 17, 2006, for U.S. Appl. No. 10/459,013 (16 pages), with Response to Office Action, filed Apr. 27, 2006, including listing of allowed claims (9 pages).

Notice of Allowance and Allowability, dated Jan. 13, 2009, for U.S. Appl. No. 11/235,243 (6 pages) with Responses to Office Action, filed Nov. 12, 2008, including listing of allowed claims (18 pages).

Second Supplemental Preliminary Amendment, filed Aug. 20, 2008, for U.S. Appl. No. 11/231,989, filed Sep. 22, 2005, including listing of claims (9 pages).

PCT Written Opinion, dated Feb. 13, 2003, for International Application No. PCT/US01/26125 (4 pages).

PCT International Preliminary Examination Report, completed May 6, 2003, for International Application No. PCT/US01/26125 (4 pages).

PCT International Search Report, dated Mar. 26, 2002, for International Application No. PCT/US01/26125 (4 pages).

PCT International Search Report, dated May 23, 2003, for International Application No. PCT/US03/06672 (5 pages).

PCT International Preliminary Examination Report, mailed Nov. 12, 2003, for International Application No. PCT/US03/06672 (4 pages).

PCT International Search Report, dated Oct. 17, 2003, for International Application No. PCT/US03/18412 (7 pages).

PCT Written Opinion, dated Aug. 2, 2004, for International Application No. PCT/US03/18412 (5 pages).

PCT Written Opinion, dated Sep. 7, 2006, for International Application No. PCT/US03/12711 (8 pages).

First Examination Report from the Government of India Patent Office, dated Dec. 1, 2006 for Patent Application No. 577/KOLNP/2005 (3 pages).

Chinese Office Action, dated Nov. 21, 2008, for Chinese Application No. 03824536.1 (14 pages).

Interview Summary, dated Nov. 30, 2004, for U.S. Appl. No. 10/459,013, filed Jun. 11, 2003 (2 pages).

Interview Summary, dated Sep. 21, 2005, for U.S. Appl. No. 10/459,013, filed Jun. 11, 2003 (2 pages).

Supplementary European Search Report, dated Feb. 17, 2009, for European Application No. 03739087.9-1525 (3 pages).

* cited by examiner

METHOD AND SYSTEM FOR STORING AND RETRIEVING DATA USING HASH-ACCESSED MULTIPLE DATA STORES

RELATED APPLICATIONS

This application is related to U.S. provisional application Ser. No. 60/366,805 filed Mar. 21, 2002 and from which it claims benefits under 35 U.S.C. §119(e).

BACKGROUND OF THE INVENTION

1. Field of the Invention

The present invention relates generally to database security, and more specifically, to a method and system for providing security in a database by providing partial access to database information in response to provided access information.

2. Background of the Invention

Present-day databases are protected from "data mining" (unauthorized copying of contents of the database) and unauthorized use (undesired access to the database) by a variety of means. Predominantly, entire databases are encrypted using an algorithm such as Data Encryption Standard (DES) or other private key/public key encryption algorithm so that access to the database requires knowledge of a key that permits decryption of the entire database.

A drawback of typical database encryption techniques is that once a user is permitted to access (decrypt) a particular database record, the user has access to the entire database. In some applications, it is desirable to restrict access to a database to a limited portion of the database. In the most restrictive sense, it is desirable to restrict access to only a single database element. For example, such security would be useful in delivery address translation systems for use by United States Postal Service (USPS) customers. Current federal statutes provide that the USPS cannot provide address lists to unrestricted and unlicensed agents, while individual address translations (from the old rural address system to the new city style address system) may be provided to anyone through a controlled process.

For the above reason, rural addresses that have been converted to a city-style address present an inconvenience in managing delivery operations. When using standard address matching software (known as a ZIP+4 engine) to standardize addresses, when a rural address is encountered, a cross-reference table: the Locatable Address Conversion System (LACS), must be used to convert the rural address to a city-style address. The ZIP+4 engine provides a full 11-digit ZIP code for a newer city-style address, but older rural addresses must be first converted to a newer city-style address using the LACS before an 11-digit ZIP code can be assigned. Since the LACS comprises an address list, the LACS cannot be generally distributed.

Typical database encryption does not provide an adequate solution for the above-described problem. Individual elements cannot typically be extracted without decrypting the database or providing a universal key and further, computation to extract small portions of the information can be quite involved as the large decryption polynomials must be computed over a significantly larger portion of the database (significantly larger than the stored element). Further, if database elements are individually protected, keys must be produced for every database element, resulting in an unworkable over-complicated system.

In the above-mentioned address translation application, as well as in many other protected database applications, a database protection scheme that protects all information other than information for which the corresponding access information is known (e.g., the street address of a particular customer for which the rural address is known) would be very useful. Retrieval software and a database could be supplied to anyone without enabling data mining or unauthorized access. Information could not be retrieved from the protected database without knowing the corresponding access information, but information could be retrieved knowing only the non-translated information.

Therefore, it would be desirable to provide a method and system for storing and retrieving information to and from a data store that provides protection of the entire database information and access to only a portion of the database information. It would further be desirable to provide a method for retrieving the information from a data store that has a relatively low computational burden. Finally it would be desirable to provide a method and system for storing and retrieving elements from a translating data store requiring only input of the non-translated information to retrieve the translation information.

SUMMARY OF THE INVENTION

The above objectives of data protection while incurring a low computational burden and requiring only entry of non-translated information to access data is accomplished in a method and system for storing and retrieving data. The method may also be embodied in a computer program product containing computer-readable program instructions for carrying out the steps of the method on a general-purpose or workstation computer system.

The method for storing data hashes a (generally public) piece of access information to generate a hashed result. The hashed result is then split into offset fields that are used as indices to a plurality of data stores. The input data for storage is split into data values as digits of the data according to a predetermined numeric base. The data values may be reordered before storing in the data stores by using a look-up table containing combinations of striping orders. An entry in the look-up table is selected via a field of the hashed result that selects a particular striping order. The reordered data is then stored in the corresponding data stores.

The method for retrieving data is similar in that the access information is again hashed to provide offsets and select the striping table entry if striping is used. The data values are retrieved via offsets of the hashed result and restored to the original order via the striping table entry. The original input data is reconstructed by computing the original stored data from the data values as digits of the input data according to the predetermined numeric base.

DETAILED DESCRIPTION OF THE EMBODIMENTS

Figure 1:
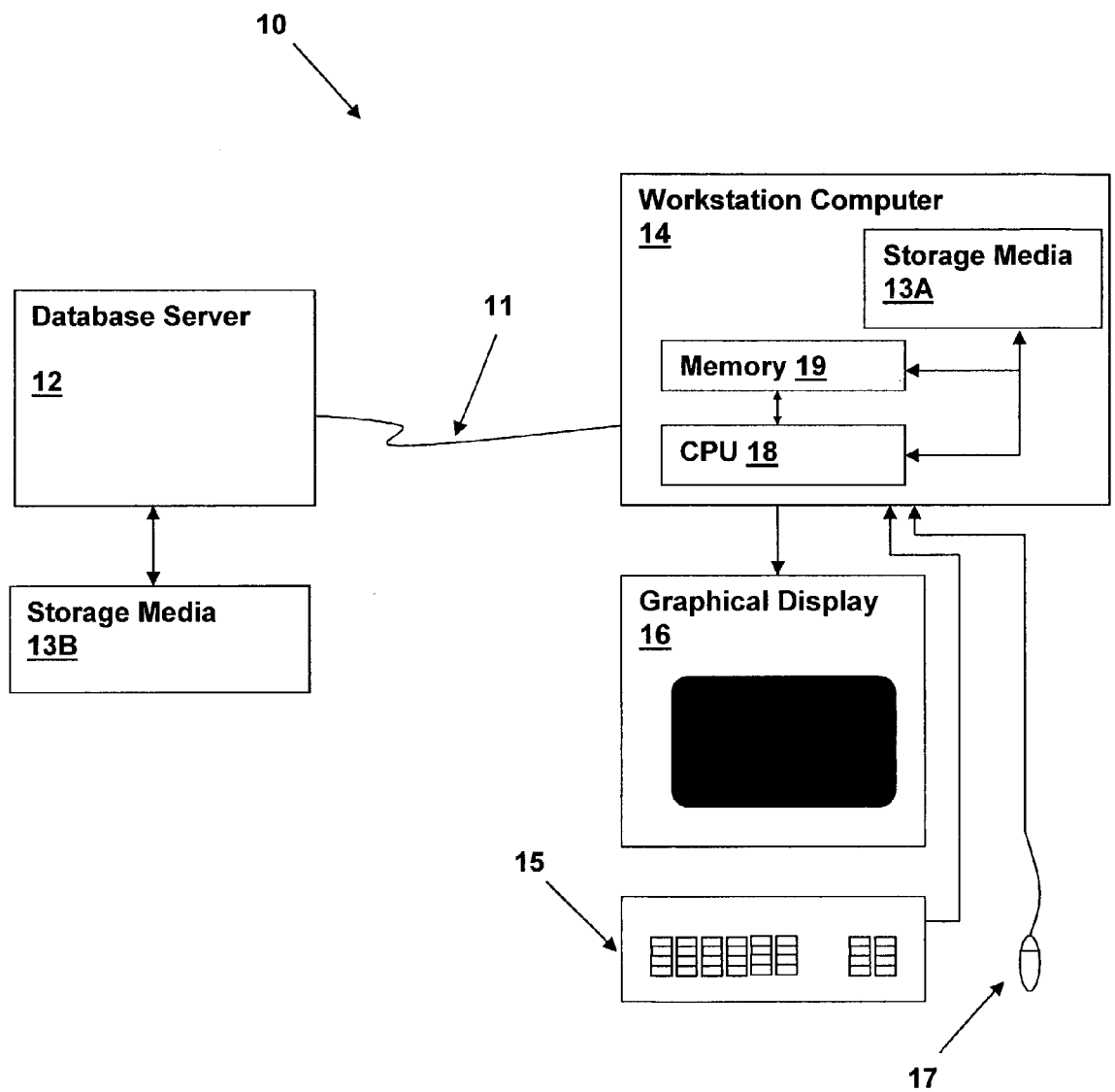
FIG. 1 is a block diagram depicting a computer system in which the present invention may be practiced.

Referring now to the figures and in particular to FIG. 1, there is depicted a computer system 10 within which a method may be performed via the execution of program instructions forming a computer program product in accordance with an embodiment of the present invention. The method may employ program instructions located within a memory 19 of a workstation computer 14 and executed by a central processing unit 18 (CPU) and the data store of the present invention may be located entirely within a storage media 13A and memory 19. Alternatively, workstation computer 14 may be coupled via a network 11 connection for coupling workstation computer 14 to a network such as a local-area network (LAN), wide-area network (WAN) or the Internet. In a network implementation, the data store and/or program instructions for implementing the methods of the present invention may be located within a database server 12 coupled to a storage media 13B.

The method of the present invention provides inherent database security, permitting distribution of a program and data store to an end-user for execution on workstation computer 14 or access to the data store and execution of the program via the Internet or other network. Other combinations such as local-hosted program with remote data store, local data store with remote-hosted program are possible and should be understood to be variations in accordance with embodiments of the present invention.

The present invention provides a method and system that store database information in multiple data stores, which may be individual data files, segments within a single data file, data structures within a single section of a data file or arranged in some other data storage implementation as are commonly known in the art of data storage and retrieval. The structure behind the present invention provides security without encryption, as portions of a single database element are spread across the multiple data stores. The relationship between the locations of the portions of the database element is not encoded and is therefore not extractable. The locations of the portions of the database element rather encode the access information, so that by knowing the access information, the database element can be retrieved.

As such, the method and system of the present invention can provide security for data where access to a database element only has a one-to-one correspondence to another piece of information (access information). In particular, two applications for the data storage and retrieval method and system of the present invention are envisioned as applied to the requirements for privacy within USPS products. The first is a rural address to new 11-digit Delivery Point Code (DPC) conversion system. Upon receiving a rural address, the database retrieval system will return the unique 11-digit DPC, along with optional hint information used for verification and resolving multiple addresses that may be coded to a singe DPC.

The second application is a name and address to change of address information retrieval system. Upon receiving both a name and an address, the system will return a unique 11-digit DPC and an effective move date, along with optional hint information as described above. The above-described particular applications are important for USPS operations, but should not be construed as limiting the method and system of the invention, in the sense that the technology may be applied to many database security requirements and a broad range of data storage and retrieval applications. Extra information, which may be the hint information described above may be stored in the data stores along with the 11-digit DPC (and the move date for the change of address system). Although the following description illustrates a technique for numerically encoding numeric data (e.g., the 11-digit DPC), other encoding may be used for alphanumeric data or unencoded data may be stored in one or more of the data stores. The extra information may be the middle initial and gender code for verification, and the hint information may be a code as described above for resolving multiple addresses. Other information may be stored along with the DPC and effective move date. The data storage technique should not be construed as limiting the secure addressing features used to store and access the data.

Figure 2:
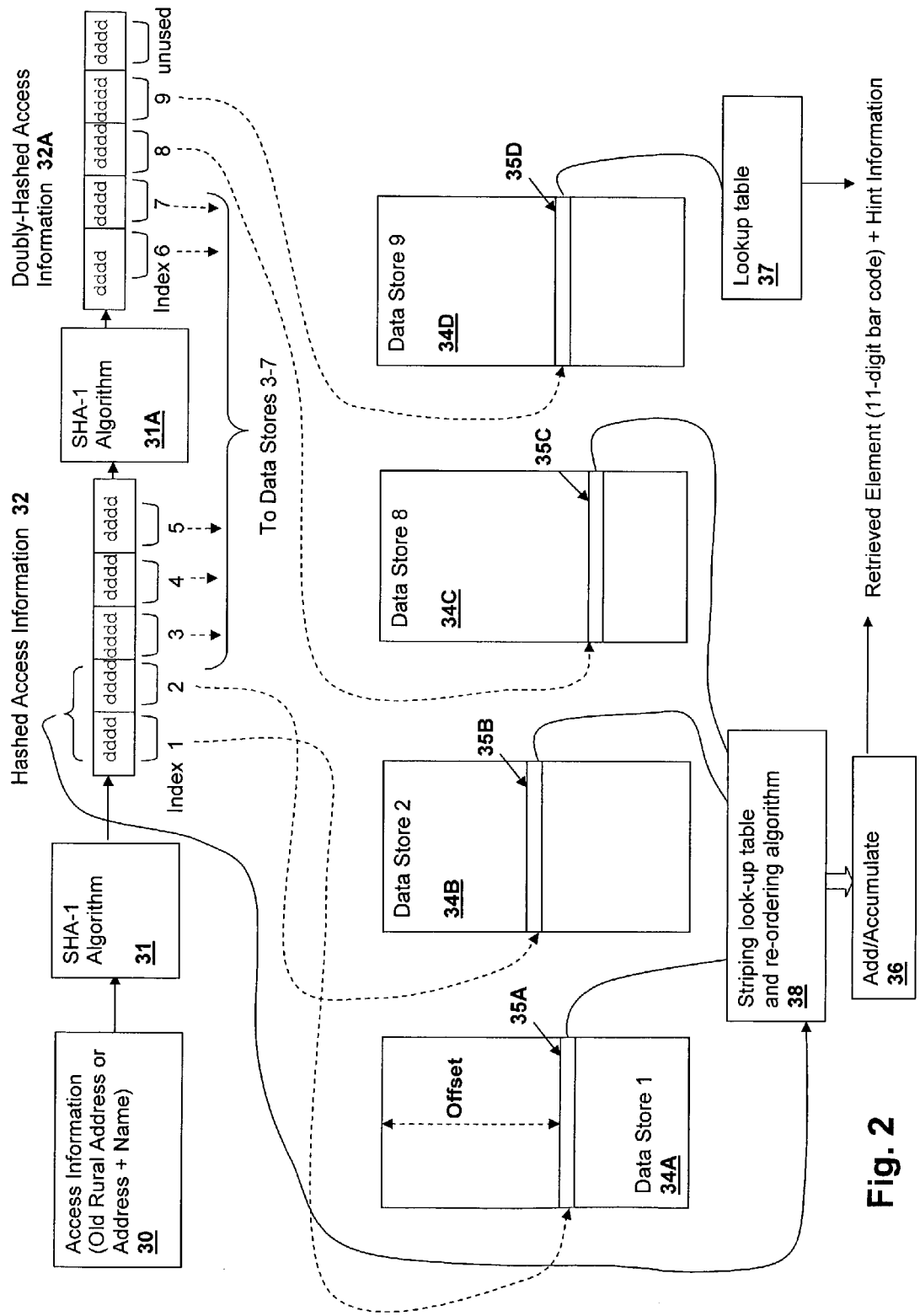
FIG. 2 is a pictorial diagram depicting the structure of database information located in multiple data stores in accordance with an embodiment of the present invention.

Referring now to FIG. 2, the structure of database information located in multiple data stores in accordance with an embodiment of the present invention is shown. Access information 30, (for example, an old-style rural address or an address and name) is hashed using a Secure Hash Algorithm 31 (SHA-1). Details of SHA-1 algorithms are described in the "SECURE HASH STANDARD", Federal Information Processing Standards Publication 180-1 issued by the National Institute of Standards and Technology (NIST), an agency of the U.S. government. The SHA-1 algorithm is typically used for producing a condensed version of a message for verification through a Digital Signature Algorithm (DSA). The condensed version of the message (the message digest) encoded in a digital signature can be compared to a message digest generated from a received for verification that the received message content is the same as the transmitted message content. The message digest is a 20-byte number that is typically used for signature/message verification, but will be used herein in a new manner to provide access to the data stores of the present invention.

The present invention uses the SHA-1 algorithm to produce a representation of the access information for the database element and not for the above-described original purpose of the SHA-1 algorithm. It should be understood that other algorithms may be used to produce the representation of the access information as used in the present invention and that use of the SHA-1 algorithm is a convenience and not a limitation of the present invention.

Access information 30 is generally pre-processed to standardize actual user input. For example, the case of alphanumeric characters may be adjusted to a single case, alphabetical representation of numbers may be converted to numeric representations, spaces may be removed, symbols and abbreviations may be standardized, etc. Given a standard access information 30, the SHA-1 algorithm 31 yields a hashed result 32 (hashed rural address in the example). The hashed result 32 of the exemplary embodiment comprises a 20-byte number. The 20-byte hashed result 32 is then split into five 4-byte fields that are used as offsets for retrieving information from 9 separate data stores 34. (The offsets are ANDed with a size of the corresponding data store minus one to yield an offset sized for the corresponding data store). Only data stores 1, 2 8 and 9 are depicted in the drawing for clarity (data stores 34A-D).

Data stores 34 vary in size and their size is determined in a build process that generates data stores 34 periodically to provide updates to the software implementing the method of the present invention. The maximum size of the data stores is $2^{32}$ bytes but generally, the table sizes will not approach this number for data sets that are smaller (such as the above-described USPS application examples, where the data store sizes typically do not exceed $2^{26}$ bytes). Further, un-hashed input information (access information) may be used to pre-select a set of data stores. For example, the first two digits of ZIP code information in the exemplary un-hashed access information may be used to select from amongst 100 sets of data stores 34 reducing the required size of data stores by a factor of 100. The size of data stores 34 as dictated by the above-described pre-selection is a system option that may be made selectable for a particular system customer or based on the memory size of a computer system executing program instructions in accordance with embodiments of the present invention.

Further, data stores are set in the exemplary embodiment to sizes corresponding to powers-of-two, and specifically to the power-of-two size that will be greater than or equal to 4 times the quantity of data values to be stored. The reason for the larger storage size is that the storage method of the present invention will allow collisions between SHA-1 results and the particular storage locations within a data store (i.e., part of the hashed result will be ignored), resulting in more than a one-to-one correspondence between SHA-1 results and data value combinations. Any conflicts occurring during generation of a particular one of data stores 34 will be marked at build time, thus providing a mechanism for avoiding conflicts during data retrieval by triggering generation of a replacement offset for the data store that returns a marker value. The conflict avoidance mechanism will be described in further detail below.

The fields extracted from hashed result 32 in the exemplary embodiment are 32-bit numbers, therefore 5 indices are available from 20-byte hashed result 32. The extracted fields are ANDed with the size of the associated data store minus one, yielding an offset sized to the associated data store size. When all of the fields have been used to generate offsets, hashed result 32 is itself hashed, again using the SHA-1 algorithm, and the resulting doubly-hashed element 32A is effectively concatenated with the original hashed element 32, yielding five more 4-byte offset fields. The above-described repeated hashing procedure can also be used and repeated as needed to avoid collisions indicated by collision flags in the data storage locations. Generating another hashed result 32 and doubly hashed result 32A, by repeating the hashing process permits eventual generation of a set of offsets that will not collide with existing data.

At least two hashed results, hashed result 32 and doubly-hashed result 32A are needed in the illustrated embodiment in order to yield at least the required 9 non-overlapping 4-byte offset fields. If overlapping fields are used (for example using a 2 byte overlap of each field) it is possible to provide 9 4-byte offsets from a single hashed result 32 in accordance with another embodiment of the invention.

Data values 35 stored at the offsets determined by the first 8 offsets correspond to digits of a number of a particular numeric base. However, to further secure the stored data from any possible mining or discovery and also to realize an even usage of individual data stores 34, the data is "striped" across data stores 34 when data stores 34 are populated, so the extracted data must be un-striped in order reconstruct the original data. Striping look-up table and reordering 38 represents a process that uses the top eight bytes of hashed result 32 as an entry pointer to a look-up table. The look-up table contains all of the possible combinations of reordering of data values 35 amongst data stores 34. Data store 8 34D is depicted as being outside of the striping algorithm in FIG. 2, but may be included as well.

The top 8-bytes of the 20 byte SHA-1 result (hashed access information 32 shifted right by 12 bytes) is divided by 5040 and the resulting modulo 5040 result (the remainder) is used to access a striping look-up table 38, provided as a file. However, any portion of hashed access information 32 could be used as an entry to striping look-up table 38, since access information 32 is quasi-random. Look-up table 38 provides 5040 combinations (7! combinations, where "!" is the factorial operator and 7! is the number of possible combinations of the 7 tables). If eight tables are used, the divisor use is 40320=8! and the look-up table expanded to include 40320 combination patterns. Look-up table 38 is provided in the software that retrieves data from data stores 34, so that extracted data can be re-ordered at the time of retrieval. The result of the look-up operation is a re-ordering of the positions of the data values extracted by hashed access information 32 in the computation of the final data output. Once the order of the original stored data pattern across data stores 34 has been determined, they are assigned in the re-ordered pattern as values for computing the retrieved element (11-digit DPC).

Data values 35 from data stores 34 1-7 are combined (once re-ordered) in an add/accumulate fashion by multiplying each data value by a numeric base raised to an power corresponding to a digit location for each re-ordered retrieved data value 35 (or by accumulating data values starting with the most significant and successively multiplying by the numeric base until a result including all digits is assembled). The numeric base chosen for the exemplary embodiment is 254, which is chosen because there are 256 values that may be stored in 1 byte and two codes 0 and 255 are reserved for special use. The digits are determined by adding 1 to the remainders, reserving code zero for representing an empty location in the data store and code 255 for marking conflicting locations.

For example, the 11-digit bar code 38118-4034-83 yields the following base 254 digits:

38118403483/254=150072454 remainder 167; digit=168
150072454/254=590836 remainder 110; digit=111
590836/254=2326 remainder 32; digit=33
2326/254=9 remainder 40; digit=41
9/254=0 remainder 9; digit=10 which are then stored in respective data stores 34 1-7 as determined by the striping pattern retrieved from look-up table 38.

Data store 8 is a special data store for storing codes corresponding to "hint" information. Hint information is used for resolving ambiguities between some addresses located at the same 11-digit bar code location (such as addresses containing designators such as the ½ in some dual-unit street addresses, apartment designations in small un-coded multiple residence units, and other designations such as trailer, lobby, lot, penthouse, suite, upper/lower, etc.). Other information can be coded in data stores 34 (data stores 1-7) such as middle initial of addressee (for tie-breaker determinations when multiple addresses match or for verification of correct address) and information such as effective move-in date (for the change of address application) is inserted in and retrieved from the remaining data store locations for the change of address application. Data store 9 can be optionally incorporated to extend the amount of data or provide a location for storing information about a type of date.

Since the relationship between data values 35A-35D is determined only by the hashed access information, a high level of security is provided by the above described database arrangement. Without knowing beforehand what each access information (e.g., rural address or address and name) is it is impossible to mine data from the database. Striping further enhances the security of data stores 34.

Figure 3:
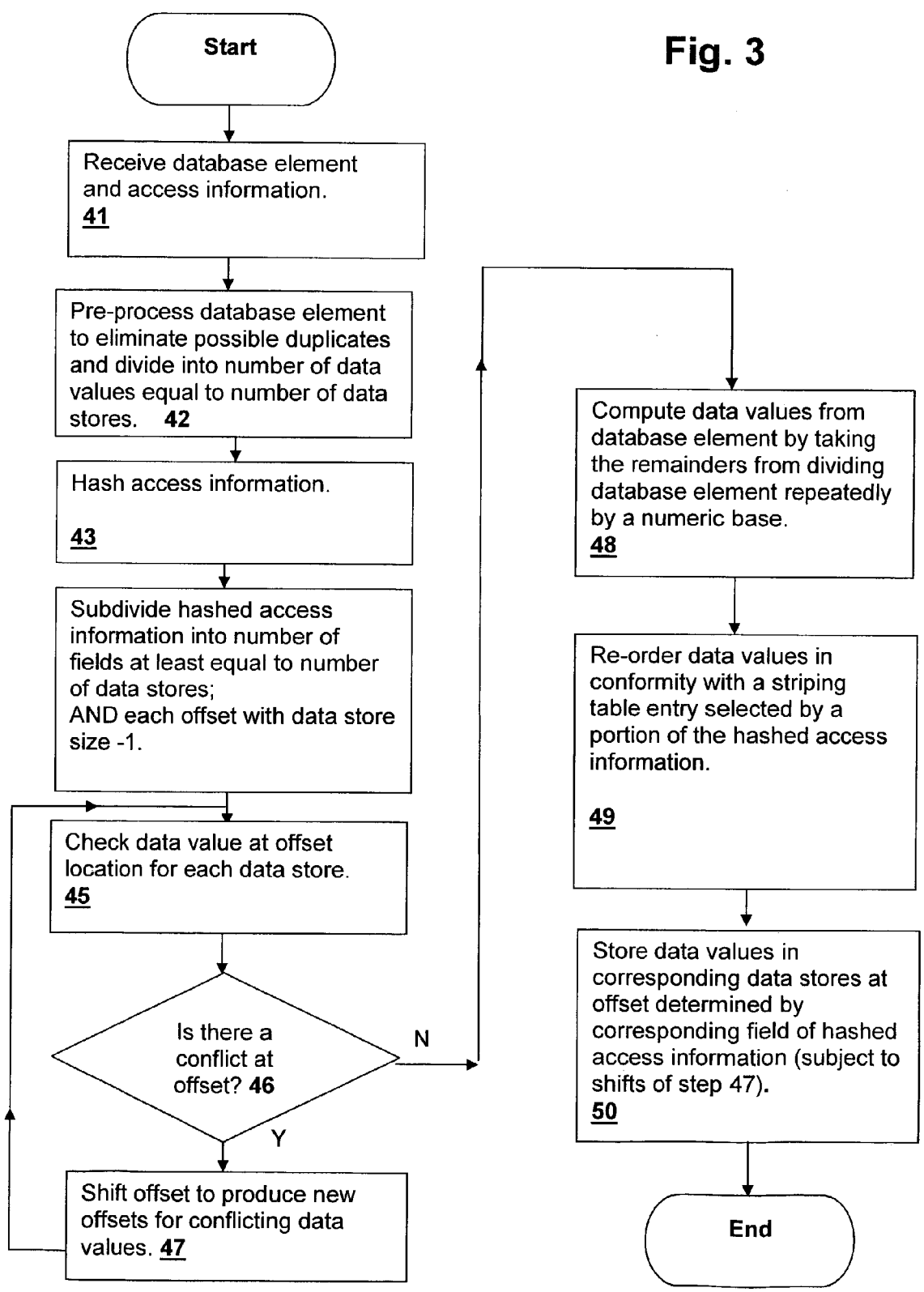
FIG. 3 is a flowchart depicting operation of the system executing a storage method in accordance with an embodiment of the present invention.

Referring now to FIG. 3, a method for storing data is illustrated in accordance with an embodiment of the present invention. First, a database element is received for storage (step 41). The access information is pre-processed to eliminate possible duplicates (step 42). Next the access information is hashed using a SHA-1 algorithm to produce a hashed element (step 43) and the hashed access information is divided into a number of non-overlapping fields that are ANDed with the size of the corresponding data store to generate an offset for accessing each data store (step 44).

When all of the fields have been used to generate offsets, the hashed element itself is hashed using the SHA-1 algorithm and the resulting doubly-hashed element is concatenated with the original hashed element in order to yield more offset fields. The above-described procedure can be repeated as needed to avoid collisions indicated by collision flags in the data storage locations.

After the offsets are generated, the data values will be generated from the database element and stored. All existing data values in each of the data stores at the associated offsets are checked (step 45) to determine whether or not a conflict exists at that location (decision 46). If there is an attempt to store a second data value at a location that is already storing a data value, a replacement offset is generated for the particular data store by shifting the particular offset field right by one byte within the hashed access information. Step 45, decision 46 and step 47 are repeated until empty locations are found for all data values (the requirement of shifting is statistically rare and the entire hashed access information should never be exhausted by the shifting process). The data storage method also relocates the data that was previously stored at the location generated from the original offset and in practice, the set of offsets that will be used to store the data can be completely generated to check for conflicts before any data storage is performed. The conflict locations are marked with code 255 so that the data retrieval method can generate replacement offsets when marker 255 is encountered.

Once a complete set of useable offsets is determined, the data values are computed from the database element by the above-described method of successively dividing by a numeric base (step 48). The remainder of each division yields a value for each successive data store. Then, the data values are reordered according to the striping look-up table entry selected by the top eight bytes of the hashed access information (step 49). Finally the data values are stored in locations corresponding to the final offsets (step 50).

Figure 4:
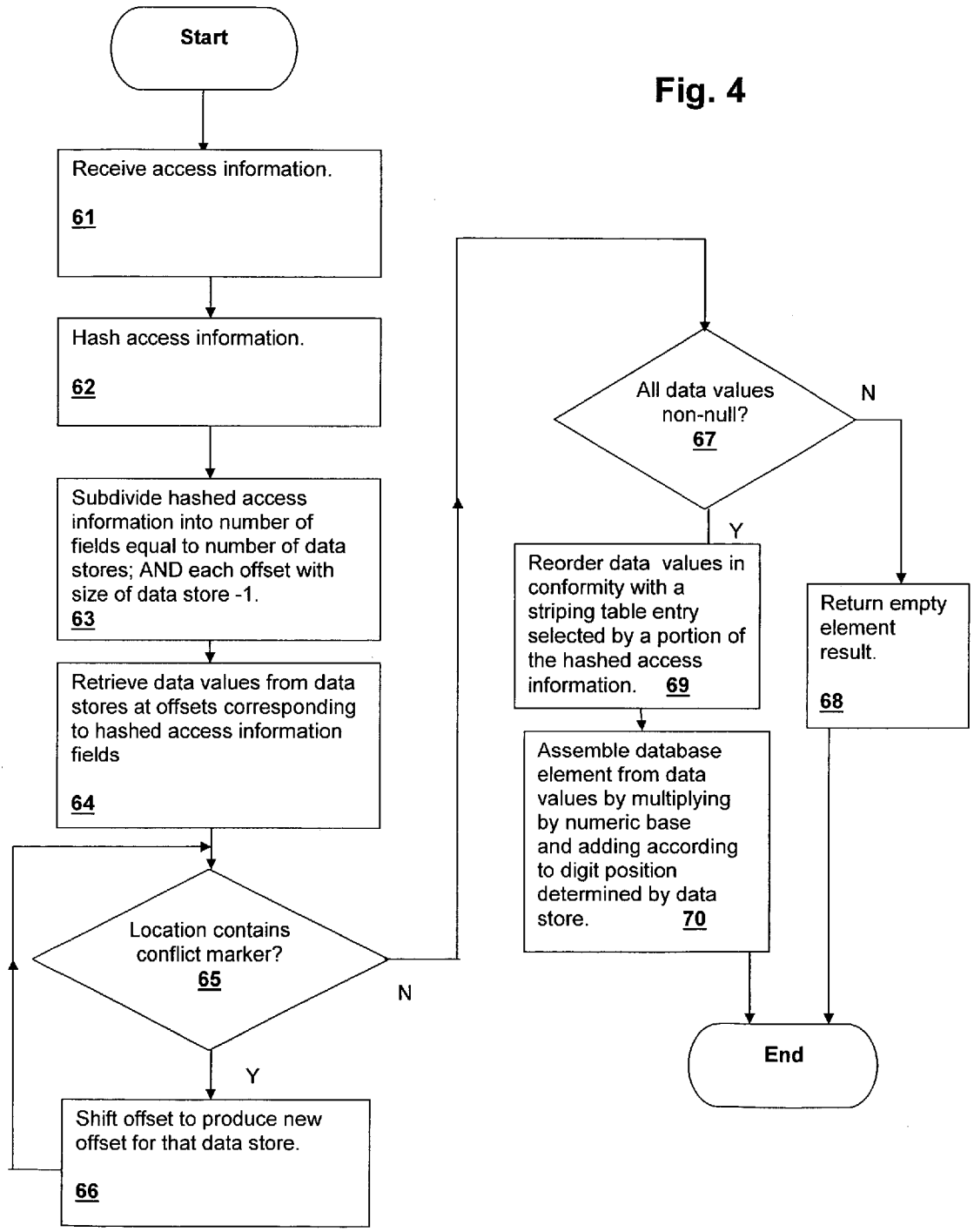
FIG. 4 is a flowchart depicting operation of the system executing a retrieval method in accordance with an embodiment of the present invention.

Referring now to FIG. 4, a method for retrieving data is illustrated in accordance with an embodiment of the present invention. First, access information is received and pre-processed to ensure a match to the access information used to tore information in the data stores (step 61). Next the access information is hashed using a SHA-1 algorithm to produce a hashed element (step 62) and the hashed access information is divided into a number of non-overlapping fields equal to the number of data stores and ANDed with the size of the corresponding data store minus one to generate an offset for each data store (step 63). Then, the data values within each data store are retrieved with the corresponding offset (step 64). If a marker is found that indicates that a storage conflict occurred during storage (decision 65) the offset is shifted one byte to produce a new offset for that data store (step 66). Step 65 and step 66 are repeated until all of the offsets return valid data values. If any or the data values retrieved are null (indicating that data was never stored at that location), an empty result is returned (step 68) indicating that no stored database element corresponds to the access information provided. If all of the data values are non-null, the data values are re-ordered according to the striping table entry selected by the top 8 bytes of the hashed access information (step 70). Finally, the database element is assembled from the data values by multiplying by the numeric base used to generate the data store information (step 70) and the database element is thus returned in response to the provided access information.

While the invention has been particularly shown and described with reference to the preferred embodiments thereof, it will be understood by those skilled in the art that the foregoing and other changes in form, and details may be made therein information is hashed using a SHA-1 algorithm to produce a hashed element (step 62) and the hashed access information is divided into a number of non-overlapping fields equal to the number of data stores and ANDed with the size of the corresponding data store minus one to generate an offset for each data store (step 63). Then, the data values within each data store are retrieved with the corresponding offset (step 64). If a marker is found that indicates that a storage conflict occurred during storage (decision 65) the offset is shifted one byte to produce a new offset for that data store (step 66). Step 65 and step 66 are repeated until all of the offsets return valid data values. If any or the data values retrieved are null (indicating that data was never stored at that location) an empty result is returned (step 68) indicating that no stored database element corresponds to the access information provided. If all of the data values are non-null, the data values are re-ordered according to the striping table entry selected by the top 8 bytes of the hashed access information (step 70). Finally, the database element is assembled from the data values by multiplying by the numeric base used to generate the data store information (step 70) and the database element is thus returned in response to the provided access information.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for accessing a data storage, comprising:
   hashing a received access information number to produce a hashed result;
   splitting said hashed result into a plurality of offset fields, a quantity of said plurality of fields corresponding to a number of separate data stores in which portions of stored data are stored or retrieved;
   receiving a data value for storage;
   computing portions of said data value from said data value; and
   accessing locations in said data stores using said offset fields as indices into said data stores, whereby said portions of said data value may be stored or retrieved at said locations,
   wherein said accessing stores said portions of said data value at said locations, whereby said data value is stored in said data storage.

2. The method of claim 1, wherein said computing generates said portions by successively dividing said data value by a predetermined numeric base to obtain a modulus of each division, and wherein each of said portions is determined from said modulus corresponding to a position of each data value portion in said data value.

3. The method of claim 1, wherein said accessing retrieves said portions of said data value from said locations, and wherein said method further comprises computing said data value from said portions of said data value, whereby said data value is retrieved from said data storage.

4. The method of claim 3, and wherein said computing combines said data value portions by multiplying said data value portions by powers of a predetermined numeric base corresponding to a position of each data value portion in said data value.

5. The method of claim 1, wherein said hashing is performed according to a SHA-1 algorithm.

6. The method of claim 1, further comprising: dividing a field of said hashed result by a predetermined striping combination number to produce a striping modulus;
   selecting a striping order from a striping order table in conformity with said modulus; and
   reordering said data value portions according to said retrieved striping order, whereby said accessing is performed in conformity with said striping order.

7. A computer system comprising a processor for executing program instructions and a memory coupled to said processor for storing program instructions and data, wherein said program instructions comprise program instructions for:
   hashing a received access information number to produce a hashed result;
   splitting said hashed result into a plurality of offset fields, a quantity of said plurality of fields corresponding to a number of separate data stores in which portions of stored data are stored or retrieved;
   receiving a data value for storage;
   computing portions of said data value from said data value; and
   accessing locations in said data stores using said offset fields as indices into said data stores, whereby said portions of said data value may be stored or retrieved at said locations,
   wherein said accessing stores said portions of said data value at said locations, whereby said data value is stored in said data storage.

8. The computer system of claim 7, wherein said program instructions for computing generate said portions by successively dividing said data value by a predetermined numeric base to obtain a modulus of each division, and wherein each of said portions is determined from said modulus corresponding to a position of each data value portion in said data value.

9. The computer system of claim 7, wherein said program instructions for accessing retrieve said portions of said data value from said locations, and wherein said program instructions further comprise program instructions for computing said data value from said portions of said data value, whereby said data value is retrieved from said data storage.

10. The computer system of claim 9, wherein said program instructions for computing combine said data value portions by multiplying said data value portions by powers of a predetermined numeric base corresponding to a position of each data value portion in said data value.

11. The computer system of claim 7, wherein said program instructions for hashing implement a SHA-1 algorithm.

12. The computer system of claim 7, wherein said program instructions further comprise program instructions for:
   dividing a field of said hashed result by a predetermined striping combination number to produce a striping modulus;
   selecting a striping order from a striping order table in conformity with said modulus; and
   reordering said data value portions according to said retrieved striping order, whereby said accessing is performed in conformity with said striping order.

13. A computer program product comprising a signal-bearing media encoding program instructions for execution within a general-purpose computer system, wherein said program instructions comprise program instructions for:
   hashing a received access information number to produce a hashed result;
   splitting said hashed result into a plurality of offset fields, a quantity of said plurality of fields corresponding to a number of separate data stores in which portions of stored data are stored or retrieved;
   receiving a data value for storage;
   computing portions of said data value from said data value; and
   accessing locations in said data stores using said offset fields as indices into said data stores, whereby said portions of said data value may be stored or retrieved at said locations,
   wherein said accessing stores said portions of said data value at said locations, whereby said data value is stored in said data storage.

14. The computer program product of claim 13, wherein said program instructions for computing generate said portions by successively dividing said data value by a predetermined numeric base to obtain a modulus of each division, and wherein each of said portions is determined from said modulus corresponding to a position of each data value portion in said data value.

15. The computer program product of claim 13, wherein said program instructions for accessing retrieve said portions of said data value from said locations, and wherein said program instructions further comprise program instructions for computing said data value from said portions of said data value, whereby said data value is retrieved from said data storage.

16. The computer program product of claim 15, wherein said program instructions for computing combine said data value portions by multiplying said data value portions by powers of a predetermined numeric base corresponding to a position of each data value portion in said data value.

17. The computer program product of claim 13, wherein said program instructions for hashing implement a SHA-1 algorithm.

18. The computer program product of claim 13, wherein said program instructions further comprise program instructions for:
   dividing a field of said hashed result by a predetermined striping combination number to produce a striping modulus;
   selecting a striping order from a striping order table in conformity with said modulus; and
   reordering said data value portions according to said retrieved striping order, whereby said accessing is performed in conformity with said striping order.

\* \* \* \* \*